March 2, 1943.                J. W. OWENS                2,312,974
                         ELECTRIC CONTROL MEANS
                         Filed Dec. 31, 1941
Fig. 1        Fig. 2        Fig. 3
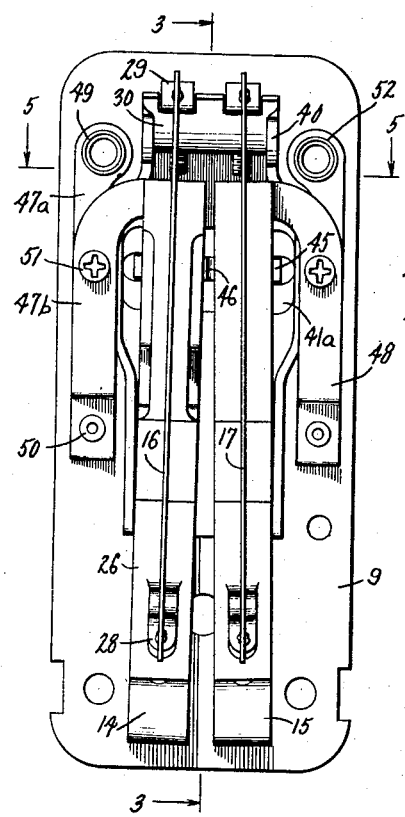
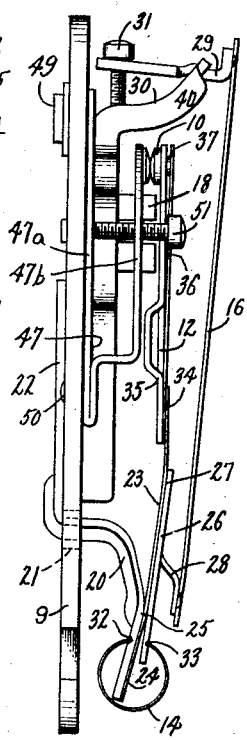
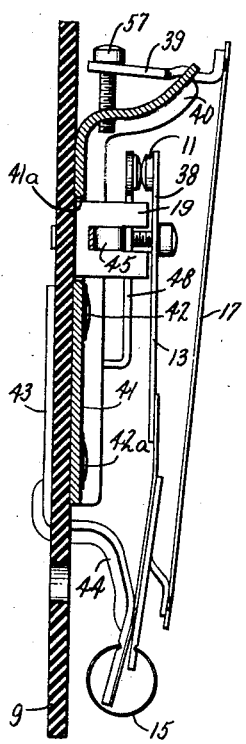
Fig. 4         Fig. 6
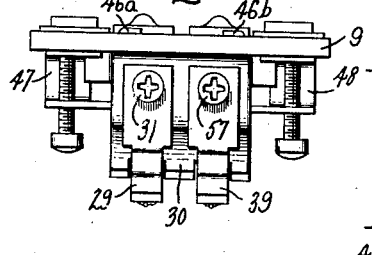
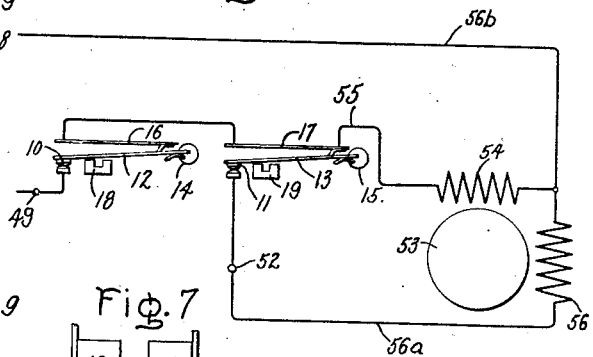
Fig. 5         Fig. 7
Inventor:
Joseph W. Owens,
by Harry E. Dunham
His Attorney.

Patented Mar. 2, 1943

2,312,974

UNITED STATES PATENT OFFICE 2,312,974

ELECTRIC CONTROL MEANS

Joseph W. Owens, Schenectady, N. Y., assignor to General Electric Company, a corporation of New York Application December 31, 1941, Serial No. 425,152

9 Claims. (Cl. 200—113)

My invention relates to electric control means, more particularly to apparatus for controlling the starting and running circuits of an electric motor thereby to start the motor and protect the motor from overload, and has for its object a simple, reliable and inexpensive device of this character.

In carrying out my invention, I provide two pairs of circuit making and breaking contacts, together with a hot wire thermostatic operating device for each of the pairs of contacts. By means of suitable springs, the movable contact of each pair is normally biased to an open circuit position but held by its hot wire thermostat in a closed circuit position against the bias of the spring under normal temperature conditions. I also provide permanent magnets for giving a snap action to each movable contact.

As applied to a split phase alternating current motor, such as used in the driving of domestic refrigerators, the hot wire thermostats are connected in series with each other in the main circuit of the motor with one pair of the contacts also connected in this main circuit and the other pair of contacts connected in circuit with the starting winding of the motor. Thus when the circuit of the motor is closed in response to the refrigerator temperature to start the motor, the total motor current flows through both of the hot wire thermostats, and the hot wire controlling the contact in the starting circuits heats quickly and thereby elongates so as to open the starting circuit contacts after a predetermined desired starting interval, such as one-fourth second.

For a more complete understanding of my invention, reference should be had to the accompanying drawing in which Fig. 1 is a plan view of motor control apparatus embodying my invention; Fig. 2 is a side elevation view of the device shown in Fig. 1; Fig. 3 is a sectional view along the line 3—3 of Fig. 1 looking in the direction of the arrows; Fig. 4 is an end elevation view of the device shown in Fig. 1 looking from the top of Fig. 1 downward; Fig. 5 is a sectional view along the line 5—5 of Fig. 1 looking in the direction of the arrows; Fig. 6 is a diagrammatic view showing control apparatus embodying my invention applied to the control of a split phase refrigerator motor; while Fig. 7 is a fragmentary view showing details of construction.

Referring to the drawing, in one form of my invention I mount apparatus for controlling the starting and running of a split phase motor on a base or support 9 made of electrically insulating material, such as a molded electrically insulating material. This device is provided with two movable contacts 10 and 11 carried, respectively, on the ends of switch or contact arms 12 and 13 which are of similar construction. The contact arms are biased, respectively, to their open circuit positions by the springs 14 and 15 and held normally in their closed circuit positions by hot wire thermostats 16 and 17, made of a suitable electric resistance material, which are substantially parallel with the base. Adjacent the ends of the contact arms are permanent magnets 18 and 19, respectively, for producing a snap closing and opening movement of the movable contact. These magnets are preferably made of an alloy having a high coercive force consisting essentially of aluminum, nickel, copper and iron, and as described and claimed in United States Patent 1,947,274 issued on February 13, 1934, to William E. Ruder.

Referring specifically to Fig. 2, the lower end of the contact arm 12 as seen in Fig. 2 is secured to a metal bracket 20 which extends in substantially parallel spaced relation with the base 9 and through a suitable aperture 21 in the base where a portion 22 is secured to the rearward or bottom side of the base, as by rivets. A portion of the contact arm 12 comprises a strip 23 made of flexible, electrically conducting spring material, such as bronze, having its lower end, as seen in Fig. 2, secured as by electric spot welding at the point 24 to the lower end of the bracket 20. A bend or hump 25 forming a curved surface is provided in the bracket 20 over which the strip 23 passes, and this bend or hump forms the pivot point of the contact arm 12 by reason of the flexing of the strip 23 on the hump.

On the top or right-hand side of the strip 23, as seen in Fig. 2, is the relatively short, straight, rigid member 26 made of a suitable material, such as steel, and secured to the flexible strip 23, preferably by means of a spot weld, at the point 27 near the upper end of the member 26. This member 26 is provided with a short projecting arm 28 intermediate its ends to which the lower end of the hot wire thermostat 16 is connected. At its upper end the wire 16 is connected to an adjustable lever or arm 29 pivoted on the end of the bracket 30 extending laterally with respect to the base. By means of a screw 31 extending through the lever 29 and in screw threaded relation with the bracket 30, the lever 29 can be adjusted thereby to adjust the tension of the hot wire 16.

The biasing spring 14 is cylindrical in form with a slot or opening in one side forming two abutting and slightly spaced ends which are seated in knife-edge bearings 32 and 33 in the oppositely disposed sides of the bracket 20 and the rigid member 26 at a point adjacent the lower end of the member 26. In applying the spring 14, the ends are separated somewhat so that the spring exerts a force tending to move the ends together and thereby tending to rock the rigid member 26 in a clockwise direction, as seen in Fig. 2, about the hump 25. It will be observed that the point of application 33 of the spring pressure is spaced an appreciable distance below the hump 25 at a point where the lower end of the member 26 is spaced from the bracket 20, these two parts diverging downward from the hump 25.

At its upper end, as seen in Fig. 2, the flexible strip 23 is spot welded at a point 34 to a rigid strip member 35 made of magnetic material and forming an armature which may be attracted by the permanent magnet 18. The short section of the strip 23 between the points 27 and 34 is bent somewhat, as shown in the figure, by the force of the magnet when the contact arm is in its closed circuit position and the armature attracted, as seen in Fig. 2. Preferably on this contact arm which must operate to open the motor circuit on overload, the movable contact 10 is secured on the end of a flexible electrically conducting spring strip 36 having its other end secured by the spot weld 34 to the armature member 35. As shown, the flexible strip 36 is secured between the strip 23 and the armature member and is relatively weak as compared with the spring member 23. It is biased normally to lie lengthwise against the armature 35. The contact 10 is secured to the end of the strip 36 by means of a pin 37 somewhat longer than the thickness of the armature member 35 which has a forked end loosely embracing the pin or stud 37. Thus when the movable contact engages the fixed contact, the armature member 35 is drawn by the magnet against the contact, thus flexing the strip 36 somewhat and producing a slight wiping action.

Preferably, the adjustment of the screw 31 is such that the hot wire 16 at normal room temperatures holds the rigid member 26 against the pressure of the spring 14 in such a position that the armature 35 is pulled by the magnet 18 to its fully attracted position shown in Fig. 2. The armature does not touch the pole faces of the magnet 18 when in the attracted position so that an air gap is left to assure a uniform holding force on the armature. Moreover, this air gap is important to prevent short circuiting of the hot wires 16 and 17 through the magnets which would occur if both armatures 35 and 38 touched their respective magnets.

The hot wire 16 is of such length and made of a suitable material such that when a predetermined current passes through the wire for a predetermined length of time, the wire is heated and elongates sufficiently to allow the spring 14 to pull the armature away from the magnet and separate the contacts. When the wire cools, it again recloses the movable contacts. Preferably, the ends of the wire are spot welded to the lever 29 and the arm 28. It will be observed that the arm 28 is in effect a lever arm having its pivot point about the hump 25.

As previously indicated, the contact arm 13 is very similar in construction to the contact arm 12 and hence it will not be described in detail.

One difference, however, is that the contact 11 is mounted directly on the upper end of the armature member 38, no flexible wiping spring being used because of the relatively fast opening movement of this contact which is connected in the starting circuit as shown in Fig. 6. In other words, the wire 17 always operates its contact 11 quickly in response to the rapid heating by the starting current, in about one-fourth second after the circuit of the motor is closed.

A common relatively wide bracket 30 is provided for the adjustment lever 29 and the corresponding adjustment lever 39 for the wire 17. This bracket 30 is a rigid plate of metal, such as steel, having a flange 40 at each side for stiffening purposes. It has a longer portion 41 lying flat against the front or upper face of the base 9. This portion 41 is secured to the base 10 by suitable rivets which pass also through the portion 22 of the bracket 20 on the opposite side of the base. As shown in Fig. 3, two rivets 42 and 42a are provided for passing through and securing to the base both that side of the portion 41 and the portion 43 of the second lower bracket 44. These rivets are insulated electrically by suitable washers made of insulating material (not shown) from the portion 41. A similar pair of electrically insulated rivets is used to secure the portion 22 of the other lower bracket to both the base and the bracket portion 41.

Also, a rectangular aperture 41a is provided in the portion 41 of the bracket 30 adjacent its upper end, this aperture being to facilitate the mounting of the two magnets 18 and 19 which are secured directly to the base in this aperture, in electrically insulating spaced relation with the bracket 30, by a spring strip or wire 45 made of non-magnetic material, such as hard brass. As shown in Fig. 5, this strip extends across the faces of the two magnets in a slot provided in each magnet with a bent spacing portion 46 between the magnets. The two ends of the strip 45 pass along the outer sides of the two magnets and extend through holes in the base where the projecting ends 46a and 46b are bent over toward each other to clinch them on the side walls of the holes and thus secure the magnets in place on the base.

In order to secure the magnets tightly against the base 9, the spring strip 45 is formed, as shown in Fig. 7, with the bottom bent into an inverted V. When a strip is put in place, the two ends are forced against the bottoms of the grooves in the magnets so that this center portion is straightened, as seen in Fig. 5, against the spring force exerted by the strip. The middle of the strip thus exerts a spring force against the magnets and holds the magnets tightly against the base 9.

Adjustable electrically conducting supports 47 and 48 are provided for the stationary contacts. The support 47 (Fig. 2) consists of two substantially parallel portions 47a and 47b, the portion 47a of which is secured by rivets 49 and 50 to the base, the rivet 49 being a special enlarged rivet and tapped to receive a terminal screw whereby this rivet serves also as a terminal for an electrical connection. The upper end of the portion 47b is bent somewhat toward the right hand, as seen in Fig. 1, to a point underneath the movable contact 10 where it carries a cooperating stationary contact. An adjustment screw 51 is provided on the portion 47b, which screw engages the portion 47a so that the position of the first portion can be adjusted thereby to adjust the position of the stationary contact. In this way, the air gap between the armature 35 and its pole faces can be suitably adjusted. As shown in the drawing, the support 48 is similar in construction to the support 47, its upper securing rivet 52 being also enlarged and tapped to provide an electrical connection.

As shown in Fig. 6, the device is connected in the circuit of the split phase motor 53 with the two hot wires 16 and 17 connected in series with each other in the main motor circuit, i. e., in circuit with the motor running winding 54, the movable contact 10 and its cooperating stationary contact being also in this circuit. It will be observed that the connections are made by connecting one supply lead directly to the terminal 49 and by connecting the lower end of the hot wire 17 by means of conductor 55 directed to the left-hand terminal of the running winding. This connection for the hot wire 17 is made by connecting the conductor 55 to the portion 43 of the bracket 44. The other terminal 52 for the other pair of contacts 11 is connected by a conductor 56a to the outside terminal of the starting winding 56.

It will be observed that the upper ends of the hot wires, as seen in Figs. 1 to 3, are electrically connected together through the adjustment levers 29 and 39 to the large bracket 30, and these upper ends of the wires are therefore electrically connected to each other through the bracket. The electric circuit from the terminal 49, which as shown is connected to one side of a suitable single phase supply source, leads through the bracket 47 and stationary contact to the movable contact 10, assuming the switch is closed, and thence through the contact arms 12 to the lower end of the hot wire 16, through the hot wire and bracket 30 to the upper end of the wire 17, and then through the wire 17 to its lower bracket 44 to the terminal portion 43 with which the conductor 55 is connected. Also, a circuit leads from the lower end of the wire 17 through the switch arm 13 and its contacts, assuming this switch to be closed, to the bracket 48 and terminal 52 which is electrically connected to one end of the starting winding. The common connection of the two motor windings is connected to the other side of the supply source by means of a conductor 56b.

As thus connected, when the motor circuit is closed by a suitable switch (not shown), which may be operated by a suitable temperature responsive device which is responsive to the temperature of a refrigerator, the entire starting and running current flows through both wires 16 and 17 in series with each other. After a predetermined period, such as one-fourth second, the wire 17 is heated by the motor current to a temperature to allow the contact 11 to move to its open circuit position in accordance with its bias by the spring 15 and thereby open the circuit for the starting winding 56. The motor is now up to full speed and operates on the running winding 54 alone, the entire running current passing through the two hot wires.

This motor running current under normal load conditions generates enough heat in the wire 17 to maintain the wire 17 at a temperature high enough to provide for the holding of the contact 11 in its open circuit position continuously by its biasing spring 15 so that the starting winding 56 remains deenergized.

The other hot wire 16, on the other hand, is not heated by normal running current hot enough to move its contact 10 to the open circuit position and, consequently, it maintains the motor circuit closed. This wire also is not heated enough to move its contact to the open position during the short starting period. In the event of a load on the motor greater than a predetermined maximum current value, which maximum current value is the current that the motor can carry continuously without being damaged by overheating, the wire 16 elongates sufficiently to open the motor circuit. Of course, the time required to heat the wire will vary inversely with the value of the current, the temperature change in the wire proportionately following the temperature change in the motor.

When the motor circuit is opened on overload, the flow of current is, of course, interrupted through the hot wires and the wires cool to reclose the starting and running circuits of the motor. The wire 17 is adjusted by its adjustment screw 57 so that it will reclose the starting circuit before the wire 16 recloses the running circuit. Consequently, after a time interval depending upon the time required for the hot wires to cool, the motor circuit is automatically reestablished for restarting of the motor. In the event that the motor is stalled and cannot start, the hot wires operate to open the starting and running circuits, as previously described, in time to prevent damage to the motor. In the event that the motor circuit remains closed with the motor stalled, the hot wires operate to repeatedly open and close the circuit.

The adjustments in the tensions of the hot wires made by the screws 31 and 57 are primarily adjustments in the low temperature of the wire at which the switch contacts are moved to their closed circuit positions. Furthermore, the adjustment of the armatures 35 and 38 with respect to the permanent magnets, which adjustment is made by adjusting the positions of the stationary contacts by means of the screws 51, is primarily an adjustment in the high temperatures of the hot wires required to effect opening movement of the contacts. These two adjustments, of course, are interdependent to some extent. Thus, while the adjusted positions of the armatures when in their closed positions have no effect on the reclosing of the contacts, the adjustment of the tensions of the hot wires to effect the desired reclosing obviously effects the hot wire temperatures required to open the contacts.

In a typical device the two hot wires are identical in size and composition. By means of the two adjustments just referred to, however, the operation of the switches as previously described was obtained. This means that the hot wires are at different temperatures when they effect operation of their switches although, since the same current always passes through both of the wires, the temperatures of the wires are substantially the same under all conditions of operation. During starting the wire 17 is adjusted for a typical motor to open its switch in about one-fourth second and before the wire 16 opens its switch because of the fact that the wire 16 must be heated to a higher temperature to open its switch. The starting current of course would cause the wire 16 to open its switch very soon after the one-fourth second period if the starting current were continued.

Another feature of this device is that it is compensated for changes in the ambient temperature. This compensation takes place by reason of the fact that the temperature coefficient of expansion of the nickel chromium alloy material of which the wires 16 and 17 are made is very nearly the same as the coefficient of expansion of the steel supporting brackets 20, 30 and 44. Preferably, the wires 16 and 17 are made of an alloy consisting of nickel 80 per cent and chromium 20 per cent.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A control device comprising a fixed support provided with a curved surface, a flexible control arm having one end secured to said support and passing over said curved surface so that said curved surface forms a pivot for said arm upon flexing of said arm about said curved surface and a thermostat connected to said arm thereby to swing said arm about said curved surface as a pivot.

2. A control device comprising a support provided with a curved surface, a flexible arm having one end passing over said curved surface whereby said curved surface forms a pivot for said arm by reason of the flexing of said arm about said curved surface, a rigid member secured to said arm at a point between said curved surface and the movable end of said arm, a spring biasing said rigid member about said curved surface as a pivot thereby to bias said arm to a predetermined position, a thermostat connected to said rigid member thereby to move said rigid member and said arm about said curved surface as a pivot, and control means operated by the free end of said arm.

3. A control device comprising a support provided with a hump, a flexible contact arm having one end passing over said hump whereby said hump forms a pivot for said contact arm by reason of the flexing of said contact arm about said hump, a rigid member extending over said hump having one end secured to said contact arm at a point between said hump and the movable end of said contact arm, a spring connected to the other end of said rigid member for biasing said rigid member about said hump as a pivot thereby to bias said arm to a predetermined position, a hot wire connected to said rigid member so as to move said rigid member and said contact arm about said hump as a pivot, and circuit control means operated by the free end of said arm.

4. A control device comprising a support provided with an intermediate hump, a flexible contact arm having one end passing over said hump and secured to said support at a point beyond said hump whereby said hump forms a pivot for said contact arm by reason of the flexing of said contact arm about said hump, a rigid member secured to said arm at a point between said hump and the movable end of said contact arm, said rigid member having one end extending over said hump to the other side thereof, a spring biasing said end of said rigid member about said hump as a pivot toward said support thereby to bias said arm to a predetermined position, a laterally extending arm on said rigid member, a hot wire connected to said arm thereby to move said rigid member and said contact arm about said hump as a pivot, circuit control means operated by the free end of said arm, and a magnet cooperating with said arm so as to give said arm a snap action.

5. A control device comprising a base made of electrically insulating material, a first support secured to said base and provided with a curved surface, a second support secured to said base in electrically insulating relation with said first support, a flexible electrically conducting contact arm extending over said curved surface and having one end movable, a connection between the other end of said contact arm and said first support, a hot wire thermostat connected to operate said contact arm about said curved surface as a pivot, a connection between the other end of said wire and said second support, said wire and said supports being made of materials having substantially the same temperature coefficients of expansion so that the operation of said contact arm by said wire is independent of changes in the ambient temperature, and a stationary contact on said base in position to be engaged by said contact arm.

6. A control device comprising a base made of electrically insulating material, a first electrically conducting support secured to said base and provided with a curved surface, a second electrically conducting support secured to said base in electrically insulating relation with said first support, a flexible electrically conducting contact arm extending over said curved surface and having one end movable, a rigid electric connection between the other end of said contact arm and said first support, a spring biasing said contact arm about said curved surface as a pivot thereby to bias said contact arm to a predetermined position, a hot wire thermostat rigidly and electrically connected to operate said arm about said curved surface as a pivot, a rigid electric connection between the other end of said wire and said second support, said wire and said supports being made of materials having substantially the same temperature coefficients of expansion so that the operation of said contact arm by said wire is independent of changes in the ambient temperature, a stationary contact on said base in position to be engaged by said contact arm, and connections connecting said supports and said hot wire in an electric circuit with said contact arm.

7. A control device comprising a base made of electrically insulating material, a first electrically conducting support secured to said base and provided with a curved surface, a second electrically conducting support secured to said base in electrically insulating relation with said first support, a flexible electrically conducting contact arm extending over said curved surface and having one end movable, a rigid electric connection between the other end of said contact arm and said first support, a rigid operating member extending along said contact arm and having one end secured to said contact arm at a point between said curved surface and said movable end, said rigid operating member extending over said curved surface and having its other end in spaced relation with the end of said first support, a spring biasing said two ends toward each other whereby said operating member and said contact arm are biased about said curved surface as a pivot thereby to bias said contact arm to a predetermined position, a hot wire thermostat rigidly and electrically connected to said operating member, a rigid electric connection between the other end of said wire and said second support, said wire and said supports being made of materials having substantially the same temperature coefficients of expansion so that the operation of said contact arm by said wire is independent of changes in the ambient temperature, a stationary contact on said base in position to be engaged by said contact arm, and connections connecting said supports and said hot wire in an electric circuit with said contact arm.

8. A control device comprising a base made of electrically insulating material, a first electrically conducting support secured to one side of said base and having a first portion extending in spaced relation with said base, said first portion being provided with a hump on the side opposite said base, a second electrically conducting support secured to the other side of said base and having a second portion extending laterally with respect to said base, a flexible electrically conducting contact arm extending over said hump, a rigid electric connection between the one end of said contact arm and the end of said first portion, a rigid operating member extending along said contact arm and having one end secured to said contact arm at a point between said hump and the movable end of said contact arm, said rigid operating member extending over said hump and having its other end in spaced relation with the end of said first portion, a spring biasing said two ends toward each other whereby said operating member and said contact arm are biased about said hump as a pivot thereby to bias said contact arm to a predetermined position, a laterally extending arm on said operating member, a hot wire thermostat having one end rigidly and electrically connected to said arm and extending in spaced relation with said base, an adjustment member on said other end of said second support, a rigid electric connection between the other end of said wire and said adjustment member whereby said contact arm is operated about said hump as a pivot by said wire in response to changes in the temperature of said wire.

9. A control device comprising a base made of electrically insulating material, a first electrically conducting support secured to one side of said base and having a first portion extending in spaced relation with said base, said first portion being provided with a hump on the side opposite said base, a second electrically conducting support secured to the other side of said base and having a second portion extending laterally with respect to said base, a flexible electrically conducting contact arm extending over said hump, a rigid electric connection between one end of said contact arm and the end of said first portion, a movable contact on the other movable end of said contact arm, a rigid operating member extending along said contact arm and having one end secured to said contact arm at a point between said hump and the movable end of said contact arm, said rigid operating member extending over said hump and having its other end in spaced relation with the end of said first portion, a spring biasing said two ends toward each other whereby said operating member and said contact arm are biased about said hump as a pivot thereby to bias said contact arm to a predetermined position, a laterally extending arm on said operating member, a hot wire thermostat having one end rigidly and electrically connected to said arm and extending in spaced relation with said base, an adjustment member on said second portion of said second support, a rigid electric connection between the other end of said wire and said adjustment member whereby said contact arm is operated about said hump as a pivot by said wire in response to changes in the temperature of said wire, said wire and said supports being made of materials having substantially the same temperature coefficients of expansion so that the operation of said contact arm by said wire is independent of changes in the ambient temperature, a stationary contact on said base in position to be engaged by said movable contact, connections for connecting said hot wire and said contacts in series with each other in an electric circuit, an armature member made of magnetic material on said contact arm adjacent its end, and a magnet secured to said base adjacent said armature member so as to cause said contact arm to operate with a snap action.

JOSEPH W. OWENS.